UNITED STATES PATENT OFFICE.

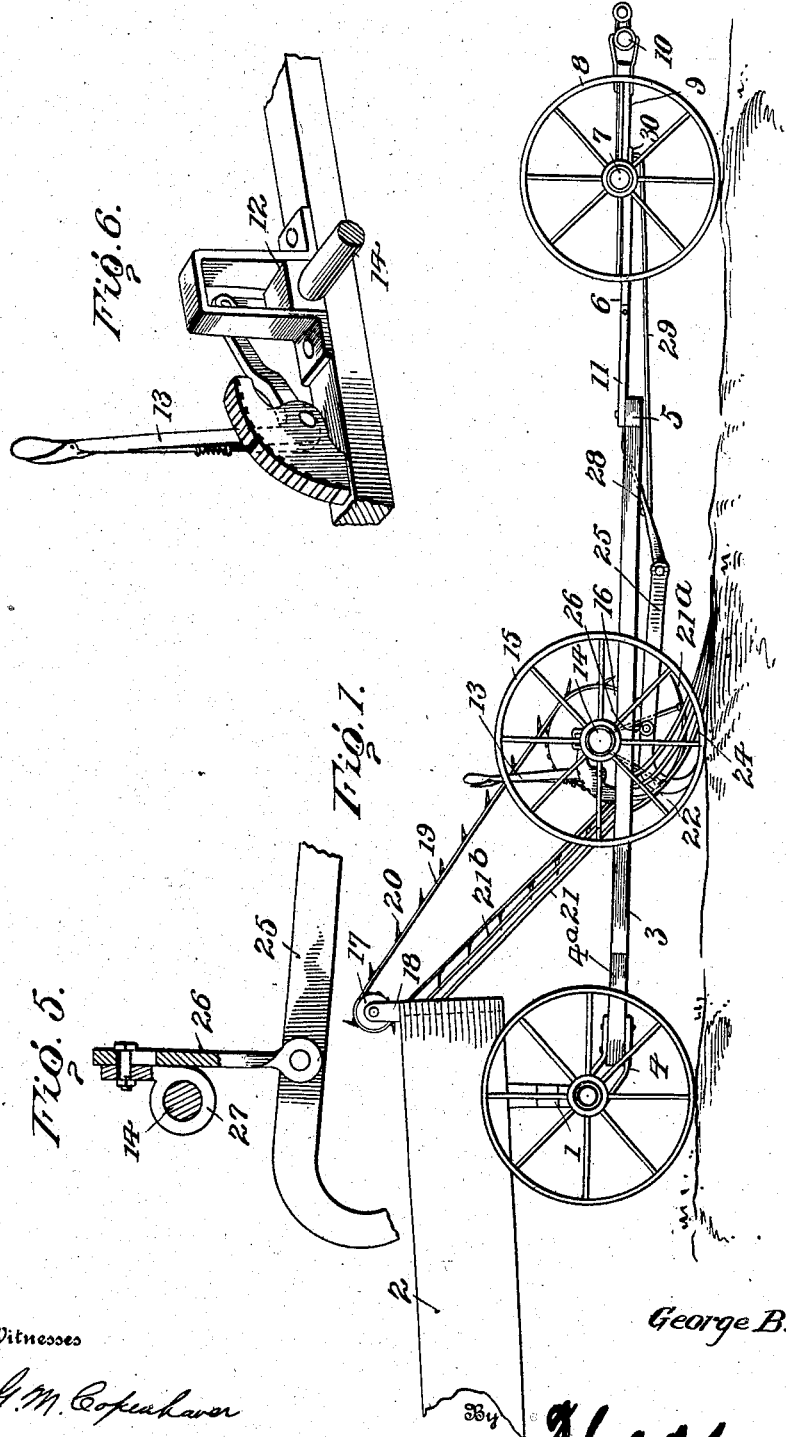

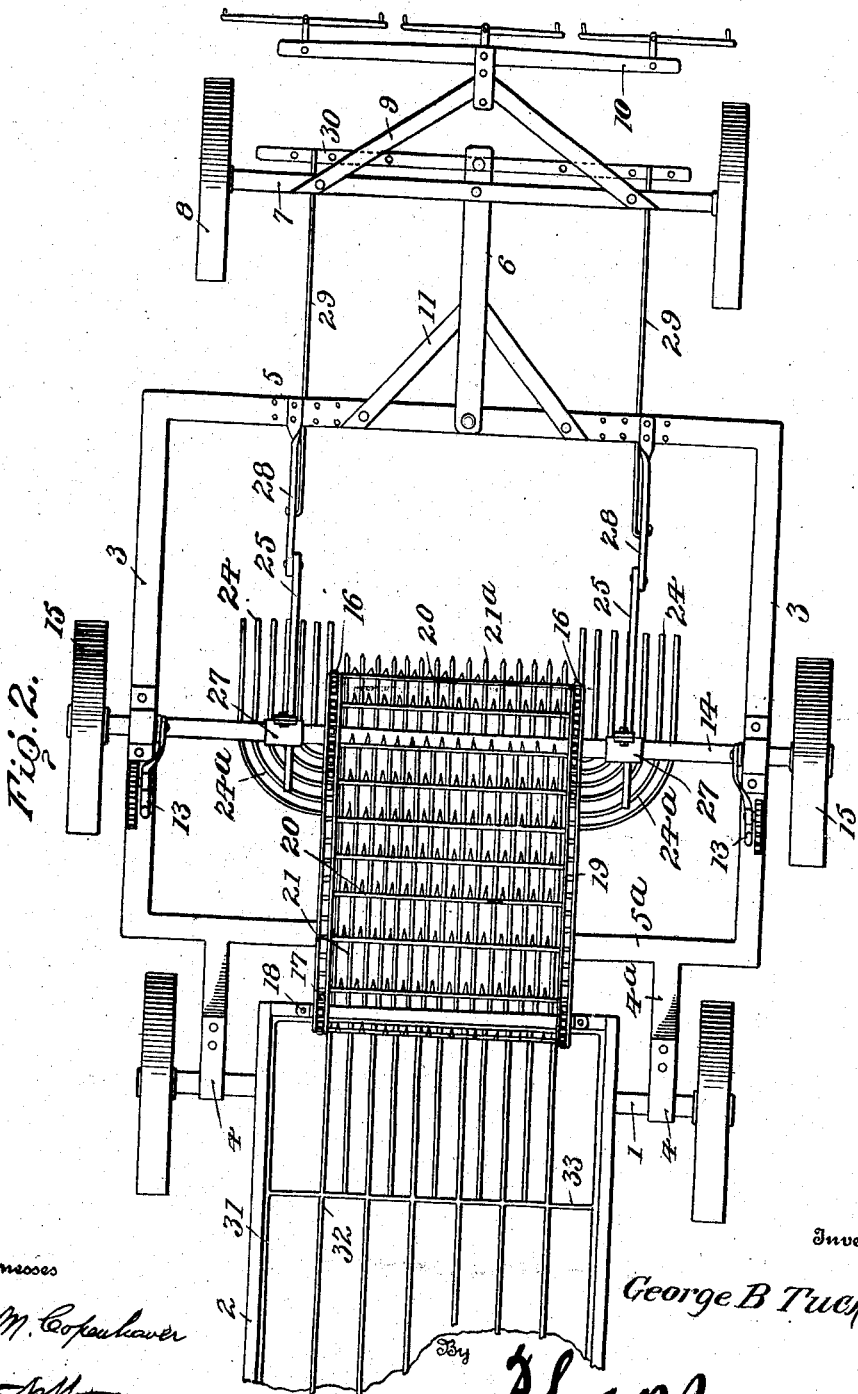

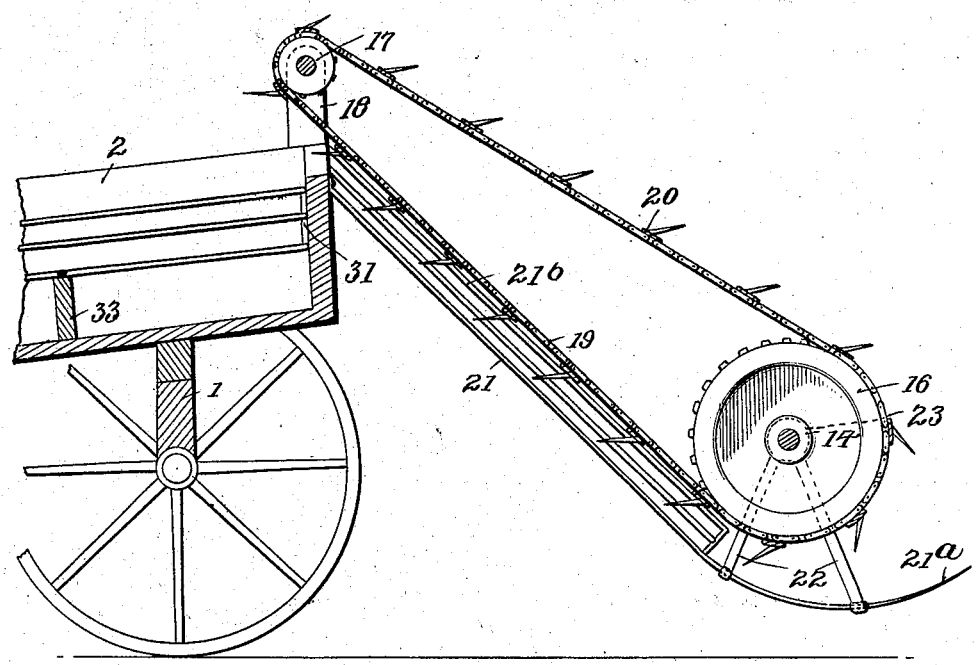
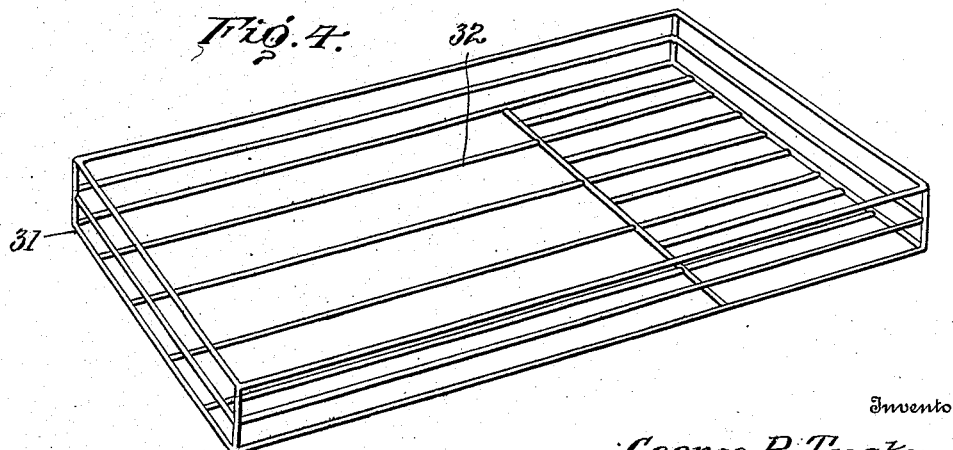

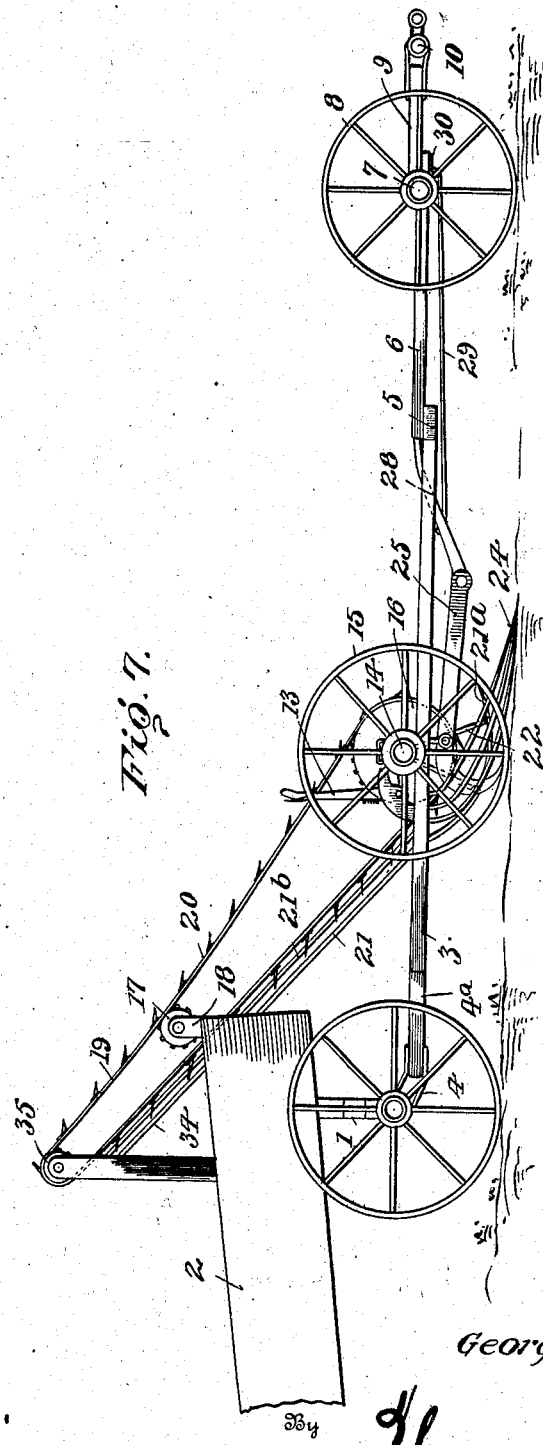

GEORGE B. TUCKER, OF HAMMOND, INDIANA.

POTATO-DIGGER.

No. 918,713.　　　　Specification of Letters Patent.　　Patented April 20, 1909.

Application filed June 6, 1908. Serial No. 437,158.

*To all whom it may concern:*

Be it known that I, GEORGE B. TUCKER, citizen of the United States, residing at Hammond, in the county of Lake and State of Indiana, have invented certain new and useful Improvements in Potato-Diggers, of which the following is a specification.

The present invention relates to improvements in potato harvesting machines, and the object of the invention is the provision of a novel device of this character which when employed in connection with a vehicle or wagon will operate in an effective manner to dig the potatoes, separate them from the soil, and deposit them in the wagon box.

The invention further contemplates a novel means which is designed to coöperate with the digging and elevating mechanisms for sorting the potatoes into various sizes.

A further object of the invention is to design a harvesting machine of this character which can also be utilized for pulling and loading beans.

For a full understanding of the invention and the merits thereof and also to acquire a knowledge of the details of construction and the means for effecting the result, reference is to be had to the following description and accompanying drawings, in which:

Figure 1 is a side elevation of a potato digger embodying the invention. Fig. 2 is a top plan view of the same. Fig. 3 is a longitudinal sectional view through the elevating mechanism, a portion of the wagon being shown. Fig. 4 is a perspective view of the sorting frame. Fig. 5 is an enlarged detail view of one of the hangers by means of which the plows are suspended. Fig. 6 is a similar view showing the mechanism for vertically adjusting the drive shaft. Fig. 7 is a side elevation showing a slight modification.

Corresponding and like parts are referred to in the following description and indicated in all the views of the drawings by the same reference characters.

The invention embodies essentially a wagon or vehicle provided with a box to receive the harvested potatoes, and a frame mounted to travel in front of the wagon and provided with means for digging the potatoes, separating them from the earth and loading them into the wagon box.

The numeral 1 designates the running gear of a wagon and 2 a wagon box supported by the running gear, a false bolster being disposed under the forward end of the wagon box whereby the same is elevated and the box is inclined downwardly toward the rear end of the wagon. The frame upon which the digging and elevating mechanism is mounted is arranged in front of the wagon and comprises the longitudinal side bars 3 having their rear ends connected by a cross bar 5ª while their forward ends are connected by the cross bar 5. A pair of beams 4ª extend rearwardly from the cross bar 5ª and are connected to the front axle of the running gear by means of the clips 4. Projecting forwardly from the central portion of the cross bar 5 is a tongue 6 having an axle 7 pivotally mounted upon the extremity thereof, the said axle being provided with the wheels 8 which serve to support the forward portion of the frame. Forwardly converging braces 9 are secured to the axle 7 and have the double tree 10 connected to the extremities thereof. It may also be observed that the tongue 6 is reinforced by means of the diagonal braces 11 which connect the tongue and the cross bar 5. With this construction it will be obvious that the axle 7 may be turned upon its axis so as to enable a short turn to be made.

Intermediate portions of the side bars 3 are provided with the bearings 12 which are mounted for vertical movement and are controlled by means of the levers 13. Journaled within these bearings 12 is a transverse shaft 14 provided at its extremities with the drive wheels 15 which are rigid therewith and are designed to engage the surface of the ground and impart motion to the shaft as the device travels forward. Rigid with the shaft 14 is a pair of sprocket wheels 16 which are spaced from each other and disposed between the side bars of the frame. Corresponding sprockets 17 are provided at the front of the wagon box 2, the said sprockets being rigid with a shaft which is journaled within suitable bearings 18 applied to the wagon box. Passing around each corresponding pair of upper and lower sprockets is a chain 19 and these chains are connected by drag members 20 are in the nature of transverse rods which are provided with a plurality of outwardly projecting teeth.

Arranged immediately below the lower reach of the elevator belt is an inclined guide way 21 which is shown as composed of a plurality of spaced longitudinal rods, the said rods being sufficiently close together to retain the potatoes while permitting of the escape of dirt or other foreign matter. The lower end of the inclined guide 21 is curved upwardly in front of the lower sprocket wheel 16 as indicated at 21ª so as to prevent any potatoes deposited upon the guide way from rolling off of the lower end thereof. It will thus be obvious that as the shaft 14 revolves the elevator belt will be driven in such a manner that the teeth upon the drag members 20 will serve to engage the potatoes and move them upwardly upon the guide way. For the purpose of preventing the potatoes rolling off the guide way at the sides thereof the said guide way is provided with the upwardly extending sides 21ᵇ which are also preferably formed of a plurality of spaced bars. The lower end of the inclined guide 21 is connected by means of the hangers 22 to boxings 23 upon the shaft so that the elevator belt and guide way will always be maintained in proper coöperative relation to each other.

Arranged upon each side of the inclined guide way at the lower end thereof is a plow 24, the said plows being each formed with a mold board 24ª which tends to turn the earth over upon the guide way. In the preferred embodiment of the invention these plows are formed of a number of spaced strips or tines which serve to engage the potatoes or other solid particles while permitting the earth to pass freely between them. These plows are carried by the plow beams 25, the rear ends of the beams being adjustably connected by means of hangers 26 to boxings 27 upon the shaft 14 while the forward ends are connected by the links 28 to the cross bar 5. It will thus be obvious that when the transverse shaft 14 is raised and lowered through the medium of the levers 13 the entire digging and elevating mechanism will be moved with the shaft. Intermediate portions of the links 28 are connected by rods 29 to opposite extremities of a bar 30 which is pivoted at an intermediate point upon the extremity of the tongue 6 and is adapted to move independent of the front axle 7. It will be observed that these rods 29 can be moved in and out upon the bar 30 and that the links 28 may be adjusted longitudinally upon the cross bar 5 to regulate the spacing of the two plows. It will also be obvious that by adjusting the hangers 26 the plows may be raised or lowered so as to make a deep or a shallow cut as may be required.

At the upper end of the inclined guide 21 the potatoes are discharged into a sorting device by means of which the smaller potatoes are separated from the larger potatoes. This sorting device is in the nature of a frame 31 which is mounted upon the top of the wagon box 2 and is provided with the spaced longitudinal strips 32, the said strips being spaced closer together at the forward portion of the frame than at the rear of the frame. That portion of the wagon box under the closely spaced strips 32 is separated from the remaining portion of the wagon box by means of a partition 33 and it will be obvious that when the potatoes are dropped upon the sorter the smaller potatoes will drop through the closely spaced strips 32 at the forward portion of the frame into one compartment of the wagon box while the larger potatoes will pass rearwardly and drop through the wider spaced strips into a second compartment of the wagon box. In this connection it may be noted that as has been previously mentioned the forward end of the wagon box is elevated by means of a false bolster so that both the wagon box and the potato sorter are inclined rearwardly, thereby causing the potatoes to move rearwardly upon the sorter by the action of gravity.

In the operation of the machine the plows 24 are set so as to cut to the proper depth and the transverse shaft 14 is lowered through the medium of the levers 13 until the drive wheels 15 contact with the surface of the ground and the plows and elevator mechanism are in operative position. As the harvester is then drawn over the field the plows serve to turn the soil together with the potatoes over upon the lower portion of the inclined guide where they are engaged by the belt and drawn upwardly upon the inclined guide 21, the soil being broken up and pulverized so as to pass through the spaced strips. At the upper end of the inclined guide way the potatoes are dropped upon the sorting device and as they roll rearwardly upon the same the small potatoes drop through the closely spaced strips at the forward portion of the frame into one compartment of the wagon box while the larger potatoes are collected in a separate compartment of the wagon box.

For pulling and loading beans the plows are set so as to make a shallow cut and merely operate to pull the beans, the mold boards throwing the beans upon the inclined guide way where they are engaged by the drags of the elevator belt and moved upwardly upon the guide way and discharged into the wagon. Should it be desired to place a rack upon the wagon it would be necessary to elevate the beans somewhat higher than would be the case with the previously described device, and for this purpose it is contemplated as shown in Fig. 7 to provide the upper end of the guide way with an extension 34 which is provided with an additional pair of sprocket wheels 35. The elevator belt is lengthened so as to pass around these two sprockets 35 and in this manner the beans may be elevated to the desired height. It will thus be obvious that with slight modifications the harvester may be employed either for digging and loading potatoes or for pulling and loading beans.

Having thus described the invention, what is claimed as new is:

1. In a harvester of the character described, the combination of a wagon, a frame mounted to travel with the wagon, a shaft journaled upon the frame, means for vertically adjusting the shaft, an elevator mechanism leading from the frame to the wagon box and having the lower end thereof supported by the shaft, digging means carried by the shaft for loosening the dirt and delivering it to the elevator, and means for adjusting the digging means with respect to the shaft.

2. In a harvester of the character described, the combination of a wagon, a frame mounted to travel with the wagon, a shaft journaled upon the frame, means for vertically adjusting the shaft, an elevator mechanism leading from the frame to the wagon box and having one end thereof supported by the shaft, and digging means also supported by the shaft, and adapted to loosen the dirt and deliver it to the elevator mechanism.

3. In a harvester of the character described, the combination of a wagon, a frame mounted to travel with the wagon, an inclined guide way leading to the wagon box and having the lower end thereof curved upwardly, an elevator belt coöperating with the guide way to elevate the potatoes, and a plow carried by the frame and operating to loosen the earth and turn it over upon the guide way.

4. In a harvester of the character described, the combination of a wagon, a frame mounted to travel with the wagon, an inclined guide way leading to the wagon box and having the lower end thereof curved upwardly, an elevator belt coöperating with the guide way to elevate the potatoes, a plow carried by the frame and operating to loosen the earth and turn it over upon the guide way, and means for vertically adjusting the plow.

5. In a harvester of the character described, the combination of a wagon, a frame mounted to travel with the wagon, an inclined guide way leading to the wagon box and having the lower end thereof curved upwardly, an elevator belt coöperating with the guide way to elevate the potatoes, and a plow formed of spaced tines, the said plow serving to turn the earth over upon the guide way.

6. In a harvester of the character described, the combination of a wagon, a frame mounted to travel with the wagon, a shaft journaled upon the frame, means for driving the shaft, an inclined guide way leading to the wagon box, a boxing upon the shaft, a hanger connected to the boxing and supporting the lower end of the guide way, sprocket wheels upon the shaft, a second set of sprocket wheels upon the wagon, an elevator belt passing around the sprocket wheels and coöperating with the inclined guide way, and means for digging the potatoes and delivering them upon the guide way.

7. In a harvester of the character described, the combination of a wagon, a frame mounted to travel with the wagon, a shaft journaled upon the frame, means for driving the shaft, an inclined guide way leading to the wagon box, a boxing upon the shaft, a hanger connected to the boxing and supporting the lower end of the guide way, sprocket wheels upon the shaft, a second set of sprocket wheels upon the wagon, an elevator belt passing around the sprocket wheels and coöperating with the inclined guide way, and a plow carried by the shaft and serving to loosen the soil and turn it over upon the guide way.

8. In a harvester of the character described, the combination of a wagon, a frame mounted to travel with the wagon, a shaft journaled upon the frame, means for driving the shaft, an inclined guide way leading to the wagon box, a boxing upon the shaft, a hanger connected to the boxing and supporting the lower end of the guide way, sprocket wheels upon the shaft, a second set of sprocket wheels upon the wagon, an elevator belt passing around the sprocket wheels and coöperating with the inclined guide way, a plow carried by the shaft and serving to loosen the soil and turn it over upon the guide way, and means for vertically adjusting the shaft.

9. In a harvester of the character described, the combination of a wagon, a frame mounted to travel with the wagon, a shaft journaled upon the frame, an inclined guide way leading to the wagon box and having the lower end thereof supported by the shaft, means coöperating with the inclined guide way for elevating the potatoes delivered thereon, a plow carried by the shaft, means for vertically adjusting the plow with respect to the shaft, and means for vertically adjusting the shaft.

10. In a harvester of the character described, the combination of a wagon, a frame arranged in coöperative relation to the wagon, a shaft journaled upon the frame, means for driving the shaft, an elevator mechanism for elevating the potatoes and delivering them to the wagon box, the said elevator mechanism being supported at one end by the shaft and at the opposite end by the wagon, a plow carried by the shaft for loosening the soil and delivering it to the elevator mechanism, and means for vertically adjusting the shaft.

11. In a harvester of the character described, the combination of a wagon, a frame mounted to travel in front of the wagon and formed with a cross bar having a tongue projecting forwardly therefrom, a shaft journaled upon the frame in rear of the cross bar, means for driving the shaft, an elevator mechanism actuated by the shaft for elevating the potatoes to the wagon box, plow beams having their rear ends supported by the shaft, plows carried by the plow beams and serving to dig and deliver the potatoes to the elevator mechanism, links connecting the plow beams to the cross bar, a bar pivotally mounted at an intermediate point upon the tongue, and rods connecting the bar to the links.

In testimony whereof I affix my signature in presence of two witnesses.

GEORGE B. TUCKER. [L. S.]

Witnesses:
 MARTHA SCHAAF,
 CATHARINE SCHAAF.